(12) United States Patent
Venkatraman et al.

(10) Patent No.: US 6,477,647 B1
(45) Date of Patent: Nov. 5, 2002

(54) SYSTEM AND METHOD FOR PROVIDING TRADE CONFIRMATIONS

(75) Inventors: Rajamadam C. Venkatraman, San Jose; Unmesh Sahasrabuddhe; Ashish Warty, both of Sunnyvale, all of CA (US)

(73) Assignee: PostX Corporation, Cupertino, CA (US)

( * ) Notice: Subject to any disclaimer, the term of this patent is extended or adjusted under 35 U.S.C. 154(b) by 0 days.

(21) Appl. No.: 09/247,117

(22) Filed: Feb. 8, 1999

(51) Int. Cl.[7] .................................................. G06F 1/24
(52) U.S. Cl. ........................ 713/193; 713/168; 713/182; 713/184; 713/202
(58) Field of Search ................................ 713/168, 182, 713/184, 193–200, 201, 202

(56) References Cited

U.S. PATENT DOCUMENTS 5,481,542 A * 1/1996 Logston et al. ............. 370/442
5,636,292 A * 6/1997 Rhoads ....................... 235/382
6,067,561 A    5/2000 Dillon

FOREIGN PATENT DOCUMENTS

| JP | 06 276221 A | 9/1994 |
| JP | 10 307792 A | 11/1998 |
| JP | 11 008617 A | 1/1999 |

* cited by examiner

Primary Examiner—Thomas R. Peeso
(74) Attorney, Agent, or Firm—Pillsbury Winthrop LLP

(57) ABSTRACT

The present invention relates to a system and method for confirming trade transactions via the Internet and/or private network to e-mail addresses. An encrypted electronic envelope and a trade confirmation document contained therein are transmitted to a customer. The customer provides a personal password to decrypt the electronic envelope to open the envelope and view the trade confirmation document. The method of transmitting the electronic envelope and the trade confirmation document provides the customer a secure and convenient manner to receive the trade confirmation. Further, after the customer has opened and closed the electronic envelope, a return receipt is transmitted back to the trade confirmation system to provide immediate notice to the system that the electronic envelope was opened and closed. The present invention also includes an exception handler subsystem for handling errors associated with the trade confirmation system.

61 Claims, 15 Drawing Sheets

FIG. 7

Confirmation Notice

Investment USA              Stock Transaction Confirmation Notice

JOHN ADAMS
REVOCABLE LIV TR U/A
DTD 04-18-77
104 CALIFORNIA ST.
SAN FRANCISCO CA 94014-5015

| ACCOUNT NO. | CUSIP | CODE | SYMBOL | TRADE DESCRIPTION | |
|---|---|---|---|---|---|
| 111-111111-1 | | 60397769 | AXYZ | AXIS YZ INC | |

| ACTIVITY | QUANTITY | PRICE | PRINCIPAL AMOUNT | FEES | S.E.C. FEE |
|---|---|---|---|---|---|
| YOU BOUGHT | 35 M | 105.821 | 37,037.35 | | |

| AS OF TRADE DATE | TRADE DATE | SETTLEMENT DATE | COMMISSION | NET AMOUNT |
|---|---|---|---|---|
| 1/22/98 | 2/04/98 | 2/04/98 | 533.02 | 37,570.37 |

OTHER INFORMATION

UNLESS YOU HAVE ALREADY INSTRUCTED US DIFFERENTLY WE WILL
HOLD THIS SECURITY IN YOUR ACCOUNT
EXECUTED BY FUND

TEST CONFIRMATION NOTICE ONLY

WE CONFIRM THIS TRANSACTION SUBJECT TO THE TERMS AND CONDITIONS
AGREED BETWEEN THE EXECUTING BROKER AND YOU THE CUSTOMER.
LEGEND FOR CAPACITY CODES.    Print   Exit   Save    1 of 3

PostX Envelope                124

Receipt for Envelope entitled "Today's Trades" sent

OK

SYSTEM AND METHOD FOR PROVIDING TRADE CONFIRMATIONS

FIELD OF THE INVENTION

The present invention relates to the field of confirming trade transactions, and more particularly, to a system and method for confirming trade transactions by transmitting secure electronic envelopes containing trade confirmations via the Internet and/or private network to a customer's e-mail address. The customer then enters a personal password to open an electronic envelope to view the trade confirmation documents contained therein.

BACKGROUND OF THE INVENTION

It is well known that people throughout the world trade (buy and sell) stocks, bonds, mutual funds, or other commodities. There are those who trade infrequently, i.e. once a year, and there are those who trade on a daily or hourly basis. Particularly for those people who are involved in frequent trading, it is essential that they constantly monitor and evaluate the economic market for fluctuations in prices of stocks, bonds, mutual funds, or the like. Because prices of stocks, bonds, mutual funds, or the like fluctuate often, it is important for those involved in such trading to find an efficient and effective way to obtain trading information.

Traditionally, people who desired to trade stocks or the like would seek the services of professional trading brokers. Using such services would generally require one to personally meet and/or talk to a professional trading broker to obtain his/her services. As can be appreciated, the traditional method can be very time consuming and inefficient, particularly for those people whose time is very valuable and limited.

Recently, however, the technological advances associated with the electronic data exchange, Internet, World Wide Web (WWW), and electronic commerce are providing many people an alternative to the traditional method described above. For example, many are now using the Internet/WWW as a preferred method for trading. As a result, many people are now trading online using an online trading company ("OTC").

FIG. 1 illustrates a simplified diagram showing a conventional system and method used for online trading, and further illustrates the system and method used for providing trade confirmations to the customer. It should be noted that, in general, when a trade is completed either online through the OTC, or through the professional broker as described earlier herein, the OTC or broker will usually send a confirmation letter to the customer confirming the trade. The confirmation letter is usually sent in paper form using regular postage mail.

Referring to FIG. 1, a customer 4 typically connects to the Internet with any available method and visits an OTC web page 6 (URL). At this time, the customer 4 trades stocks, bonds, or the like, and the trade details are generally stored in an OTC database 8. The OTC 2 will use the trade details stored in the OTC database 8 and create a hardcopy (paper) confirmation that is enclosed in a paper envelope 10 for mailing to the customer 4. The paper envelope 10 containing the hardcopy confirmation will usually arrive at the customer's home or business address in 2–5 days from the mailing date of the paper envelope 10. Thus, a problem exists where the customer 4 will not know whether the online trades were actually consummated for at least 2–5 days until the customer 4 receives the hardcopy confirmation.

In addition to the problem of not knowing whether the trades were consummated for at least 2–5 days, other problems exist with the system and method described above. For example, the process of preparing the paper envelope 10 containing the hardcopy confirmations requires the use of various resources, which in turn increases the cost for the OTC. The OTC must purchase papers, envelopes, stamps, printers, etc. in order to prepare and mail off the hardcopy confirmations to its customers. The OTC also uses human resources to prepare the hardcopy confirmations and envelopes. Further, even if the confirmations and envelopes were properly prepared and mailed off, there is the possibility that some confirmations and/or envelopes may be lost or destroyed during the delivery process.

Further, there are security issues that need to be addressed when trade confirmations are transmitted over the Internet. As is well known, most information transmitted over the Internet are unsecured, but certain information such as trade confirmations require the strictest security measures. Most systems and methods available today are not believed to provide the necessary security for transmitting trade confirmations.

Thus, there is a need for a system and method that can provide trade confirmations to the customer in a reliable and efficient manner. There is also a need to provide the customer trade confirmations in a manner that uses optimal security measures. Accordingly, the present invention is directed to a system and method for providing trade confirmations in a secure and efficient manner via the public Internet and/or private network to the customer's e-mail address.

SUMMARY OF THE INVENTION

It is an object of the present invention to provide a system and method that can transmit trade confirmations via a public Internet and/or a private network to e-mail addresses.

It is another object of the present invention to provide a system and method that can transmit trade confirmations in a secure and confidential manner via a public Internet and/or a private network to e-mail addresses.

It is yet another object of the present invention to provide a system and method that can transmit trade confirmations in a cost efficient and timely manner via a public Internet and/or a private network to e-mail addresses.

It is a further object of the present invention to provide a system and method that can transmit trade confirmations in a convenient manner.

It is an object of the present invention to provide a system and method that can transmit trade confirmations in a secure electronic envelope.

It is another object of the present invention to provide a system and method that eliminates or reduces the postage and printing costs associated with mailing hardcopy confirmations.

It is a further object of the present invention to provide a system and method that allows the customer to receive trade confirmations from various locations.

It is yet another object of the present invention to provide a system and method that can transmit a return receipt to the sender when an electronic envelope was received and opened by the recipient.

These and other objects of the present invention are obtained by providing a system and method that provides trade confirmations to the customer in a secure and costeffective manner. After executing a trade online, the customer will receive an encrypted electronic envelope containing the trade confirmation document at the customer's e-mail address. The electronic envelope is secured and marked with a date/time stamp for security purposes. The customer then provides a personal password to decrypt the electronic envelope. After providing the correct password, the confidential trade confirmation document is displayed to the customer. A return receipt is then transmitted to the sender notifying the sender that the electronic envelope was successfully received and opened.

BRIEF DESCRIPTION OF THE DRAWINGS

These and other objects and advantages of the present invention will become apparent and more readily appreciated from the following detailed description of the presently preferred exemplary embodiment of the invention taken in conjunction with the accompanying drawings, of which:

FIG. 7 illustrates a window showing an electronic trade confirmation document in accordance with the preferred embodiment of the present invention;

FIG. 8 illustrates a window showing a return receipt notifying a recipient that a sender will receive a notice that an electronic envelope was delivered and opened in accordance with the preferred embodiment of the present invention;

DETAILED DESCRIPTION OF THE PREFERRED EMBODIMENTS

Figure 1:
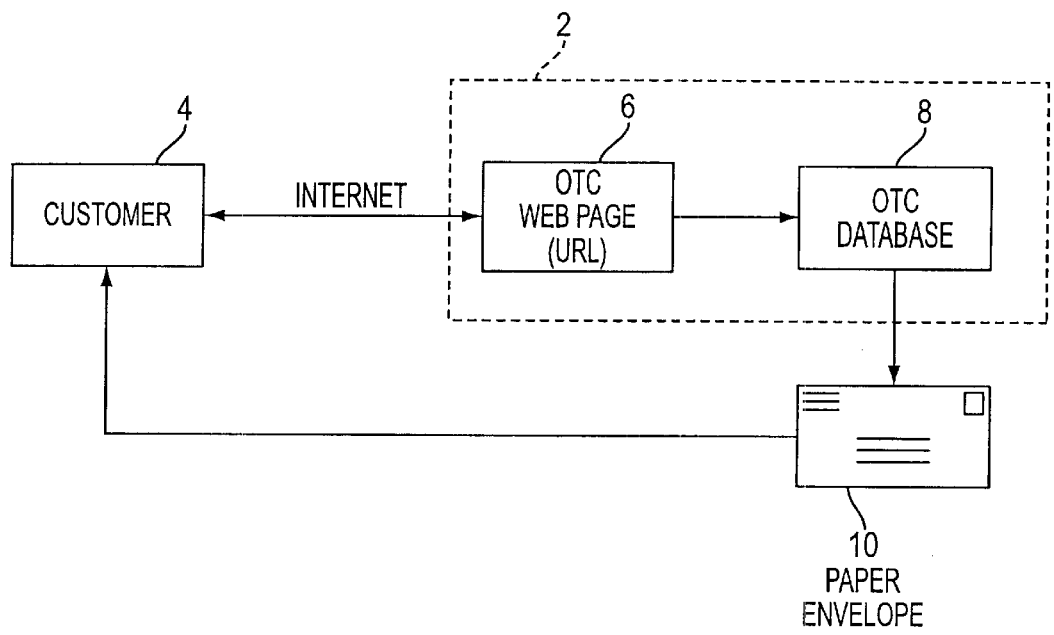
FIG. 1 illustrates a simplified diagram showing a conventional system and method used for online trading and for providing trade confirmations to the customer.

The preferred embodiment of the present invention will now be described with reference to FIGS. 2–20, wherein like components are designated by like reference numerals throughout the various figures. The present invention is directed to a trade confirmation system and method after the customer completes online trading. Although the principles of the present invention can be applied to services other than for online confirmations of trade details, the preferred embodiment of an online trade confirmation system and method will be described in detail. Moreover, one skilled in the art will appreciate that various substitutions and modifications can be made to the examples described herein while remaining within the spirit and scope of the present invention.

Figure 2:
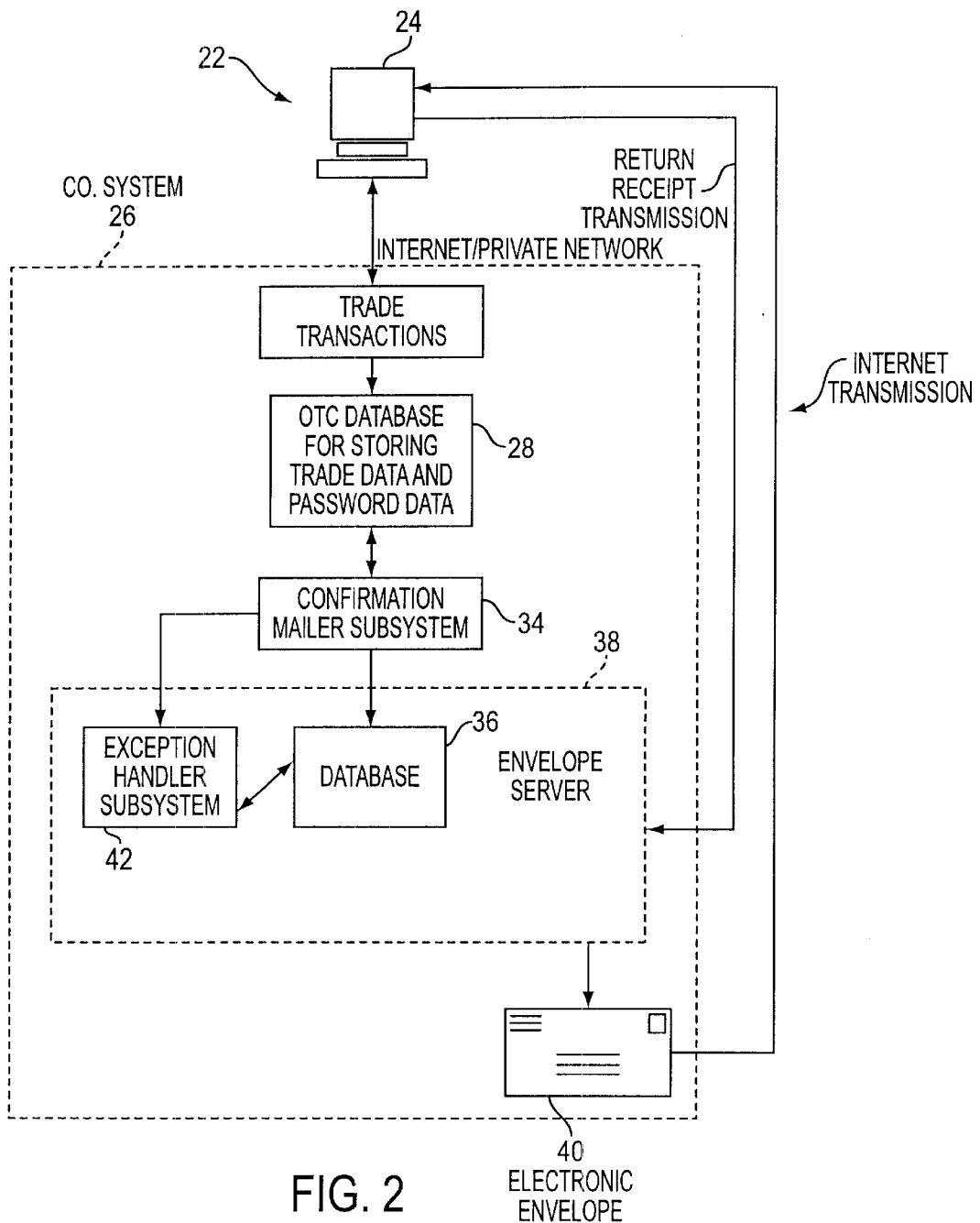
FIG. 2 illustrates a hardware configuration of an online trade confirmation system in accordance with a preferred embodiment of the present invention.

FIG. 2 illustrates a hardware configuration of an online confirmation trade system in accordance with the preferred embodiment of the present invention. A customer (subscriber) typically uses a station 22 such as a computer, palm pilot, webtv, printer, fax machine, or the like that is capable of receiving and transmitting data over the Internet and/or the private network. Generally, the station 22 includes a display device 24 for viewing web pages and e-mails, a keyboard, keypad, and/or mouse (not shown) for inputting requests, and a modem (not shown) for connecting to the Internet via a standard telephone line. Alternatively, other electronic devices, such as wireless devices, may also be used to connect to the Internet or the private network in accordance with the preferred embodiment of the present invention.

The customer at the station 22 conducts online trading through an OTC system 26 by visiting an OTC web page. After such trades are completed, data from the trade details as well as the customer password data are stored in an OTC database 28. The OTC database 28 may also store other data besides the trade and password data.

A confirmation mailer subsystem 34 will first access data from the OTC database 28 in order to prepare the trade confirmation document. There are several ways data can be provided to the confirmation mailer subsystem 34. For example, preferably, the trade and password data can be extracted from the OTC database 28 in the form of files. These trade and password files can then be inputted into the confirmation mailer subsystem 34 on a daily basis. Another way is for the confirmation mailer subsystem 34 to directly retrieve the data from the OTC database 28.

Next, the confirmation mailer subsystem 34 parses and imports the required data from the OTC database 28 to an envelope server database 36. An envelope server 38, as described more fully later herein, generates a trade confirmation document for the customer using the parsed and imported data. The generated trade confirmation document is then included in a secure electronic envelope 40 of the type described in U.S. patent application Ser. No. 08/845,722, assigned to the same assignee, which is hereby expressly incorporated by reference. The secure electronic envelope 40 is also generated by the envelope server 38, and transmitted to the customer via the Internet or private network to the customer's e-mail address at the station 22 using, for example, an OTC SMTP/POP3 mail server (not shown). The envelope server 38 preferably transmits the confirmation document to the customer in .htm format, but other formats may be used. The customer at the station 22 receives the electronic envelope 40 and opens it by providing the personal password.

Figure 6:
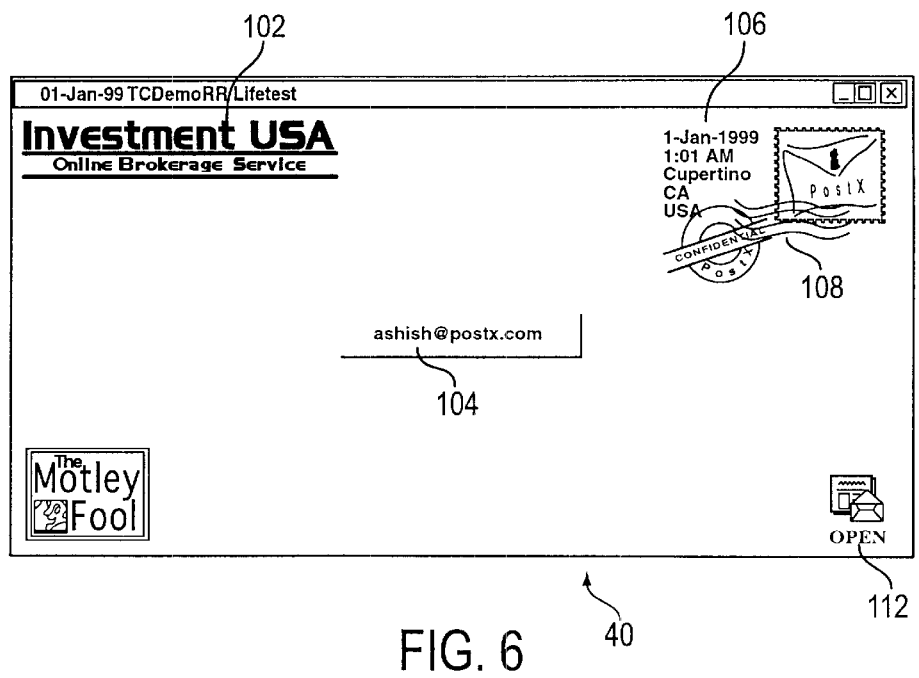
FIG. 6 illustrates a window showing a front of an electronic envelope in accordance with the preferred embodiment of the present invention.

Preferably, the envelope server 38 can run on any server operating system, i.e. Window NT (Windows NT is a registered trademark of Microsoft Corporation) or UNIX, and the electronic envelope 40 is a Java based application (Java is a trademark of Sun Microsystems). The envelope server 38 includes electronic templates, described further hereinafter, that are used to create the electronic envelope 40 from data imported from the OTC database 28. Electronic templates such as the "Investment USA trade confirmation" template as shown in FIG. 6 are included with the envelope server 38. The electronic envelope 40 is further encrypted (sealed), and marked with a date/time stamp to ensure the confidentiality and security of it and its contents as it travels over the Internet. The envelope server 38 then distributes the electronic envelope 40 to the customer over existing e-mail infrastructure, and further manages e-mail traffic, provides error tracking, displays statistics for project analysis, and receives return receipts after the customer has opened, viewed, and closed the electronic envelope 40, as described further hereinafter. Preferably, a single envelope server 38 is capable of sending and processing millions of electronic envelopes 40 in a month.

An exception handler subsystem 42, which is coupled to the confirmation mailer subsystem 34 and the envelope server database 36, processes all errors (at all import, send, and bounced back stages), and provides those customers, who were unable to receive the electronic trade confirmations, the trade confirmations in another form (mail, fax, etc.). The exception handler subsystem 42 can also transmit error messages to an OTC e-mail address so that the OTC system 26 or an OTC operator can take appropriate action. For example, whenever there are parsing errors, error messages are preferably transmitted immediately, and whenever there are "bounced back" e-mails, error messages are preferably sent daily. The exception handler subsystem 42 is described in more detail later herein.

Figure 3:
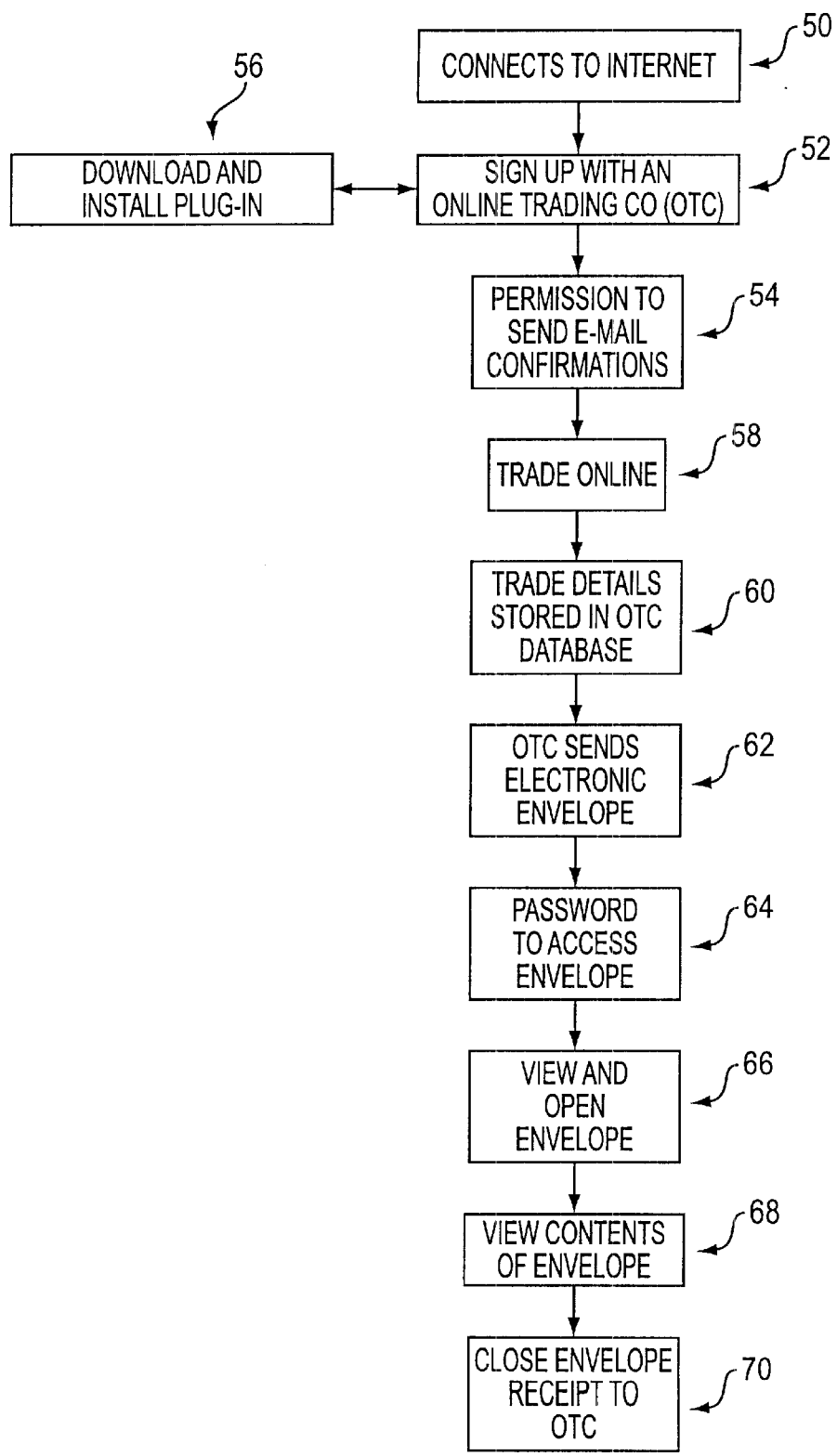
FIG. 3 illustrates a flow chart of a method for trading and receiving online trade confirmations in accordance with the preferred embodiment of the present invention.

FIG. 3 illustrates a flow chart of a method for trading and receiving online trade confirmations in accordance with the preferred embodiment of the present invention. Reference will also be made to FIGS. 4–8 for a more complete understanding of the method of trading and receiving online trade confirmations.

First, the customer at the station 22 connects to the Internet at step 50 via its Internet Service Provider or a Commercial online service in order to visit the OTC web site. The customer can connect to the OTC web site using other connection methods such as a T1 or T3 lines or the like. Next, at step 52, the customer chooses and signs up with the OTC of the customer's choice that is capable of transmitting trade confirmations via the Internet to the customer's e-mail address in accordance with the present invention. The information required to sign up to the OTC are all information necessary to open an online trading account, as is well known in the art, and such information are then stored in the OTC database 28.

Figure 4:
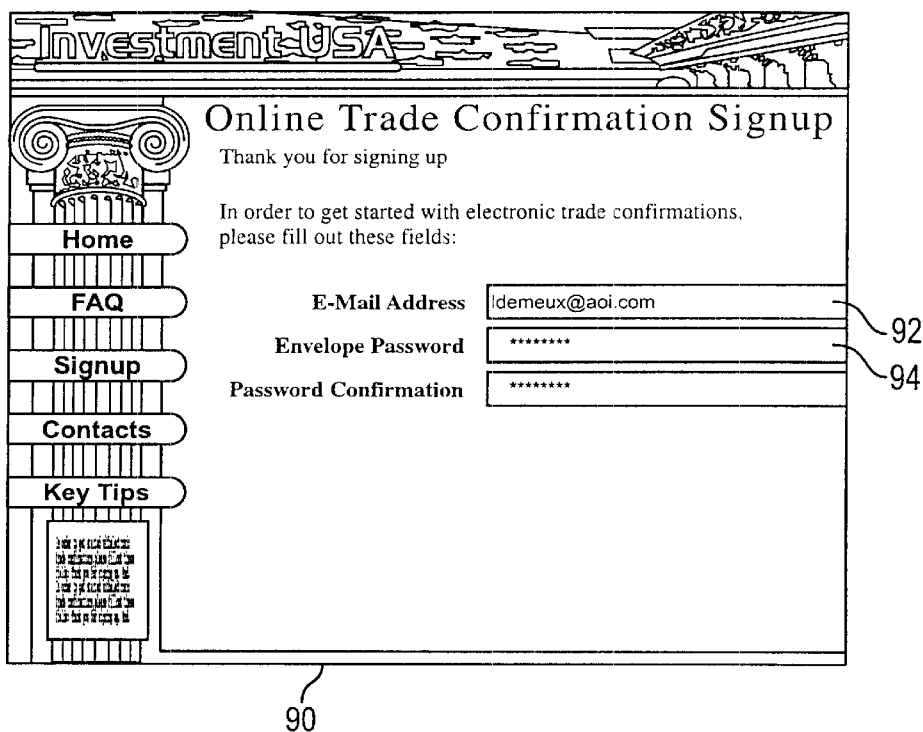
FIG. 4 illustrates a sign up window used to initiate the transmitting of an online trade confirmation in accordance with the preferred embodiment of the present invention.

After choosing and signing up with the OTC, an online trade confirmation sign-up window 90 such as the one illustrated in FIG. 4 is displayed to the customer. The sign-up window 90 is used to initiate transmissions of online trade confirmations in accordance with the present invention when. the customer trades online. The customer enters the customer's e-mail address where the customer desires to receive the trade confirmations in an e-mail address box 92 and enters a personal password (PIN) in an envelope password box 94 that is needed to open and view the electronic envelope 40. At step 54, the customer gives the OTC authority to transmit the customer's trade confirmations electronically to the customer's e-mail address when the customer's e-mail address and envelope password have been provided to the OTC and the customer completes an online trade. Referring back to FIG. 2, the trade details and the customers passwords are stored in the OTC database 28. The customer's e-mail address is also stored in the OTC database 28 so that the OTC can obtain prompt access to such information.

Next, in order to receive and view the electronic trade confirmation via email, a Java plug-in is preferably downloaded and installed on the customer's station 22 in step 56. Any known method of downloading and installing the plug-in may be used in accordance with the present invention. For some customers, a plug-in may already be installed on the station 22, and thus, step 56 may not be needed. Preferably, the plug-in contains the electronic envelope rendering code, encryption-decryption code, and client interaction (response) handling code.

The customer can now trade online in step 58 and recieve electronic trade confirmations via e-mail. During the course of the day, the customer may trade stocks, bonds, mutual funds, etc. online by visiting the OTC web site. The trade details of the day's trading are then stored in the OTC database 28 in step 60.

At any time after the customer completes a trade, the OTC can transmit an e-mail attaching the secure electronic envelope 40 to the customer in step 62, at which time the customer can confirm the trade. Various events that can trigger the beginning of the transmission of the electronic envelope 40 will be described in more detail later herein. Once the e-mail arrives at the customer's station 22, the customer can then click on an attached envelope icon (not shown) in the e-mail message in order to open the electronic envelope 40. The customer's default web browser, i.e. Netscape Communicator/Navigator, Microsoft Internet Explorer, etc., then begins the process of opening and displaying the electronic envelope 40 to the customer.

Figure 5A:
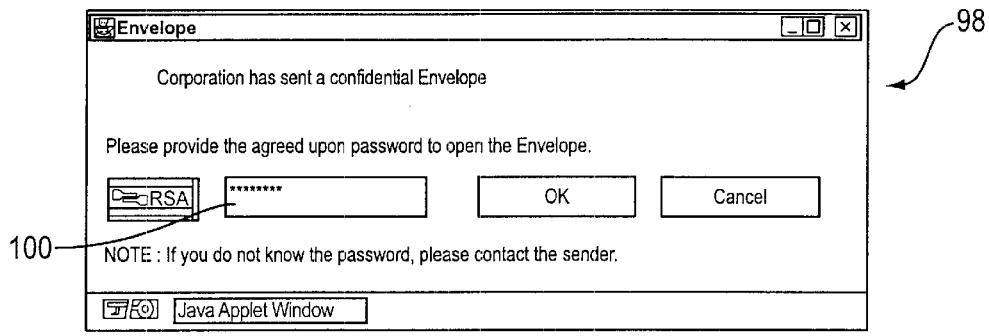
FIG. 5A illustrates a window showing a password security box for opening and viewing an electronic envelope in accordance with the preferred embodiment of the present invention.

With reference to FIG. 5A, an envelope password security window 98 is displayed requesting the customer to enter the personal password previously entered in step 54. The password entered by the customer at step 64 should be the same as the customer's password stored in the OTC database 28. Entering the correct password in a password box 100 causes the electronic envelope 40 to become decrypted at the station 22. As described above, the envelope server 38 encrypts the electronic envelope 40 and the documents contained therein before the electronic envelope 40 is transmitted to the customer. This added security measure provides assurance to the customer that the electronic envelope 40 and the trade confirmations contained therein are secure and confidential until the customer provides the correct password.

Figure 5B:
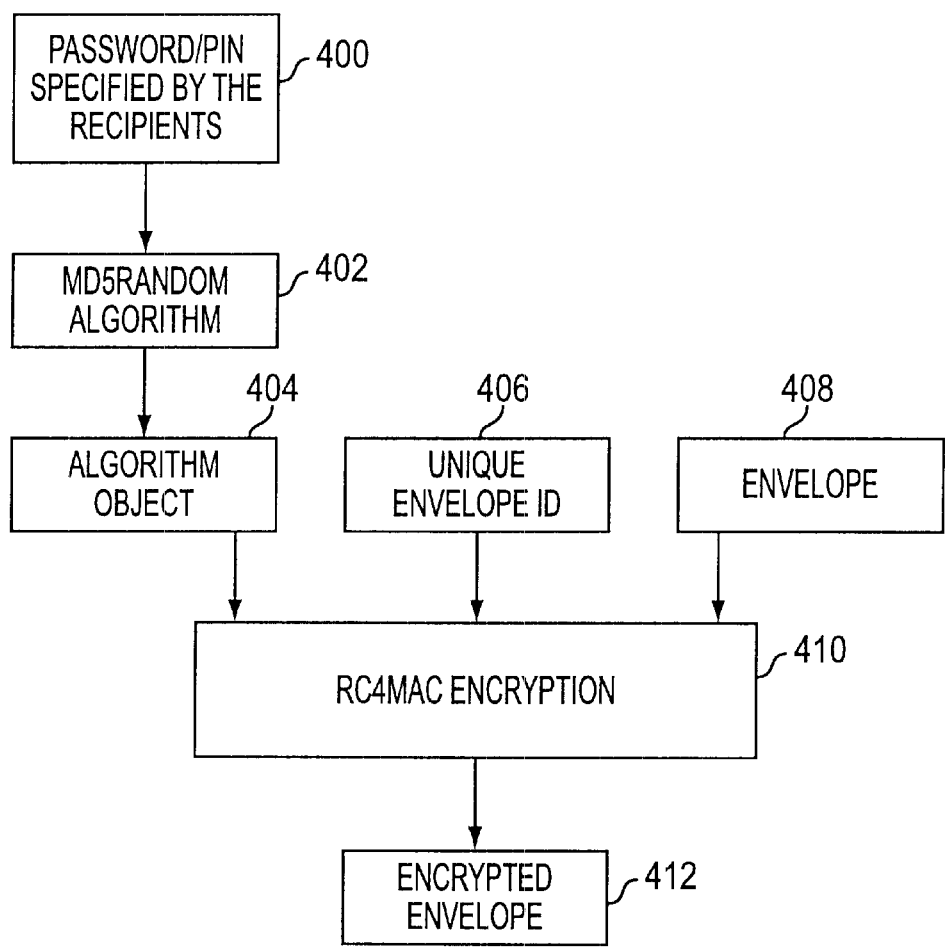
FIG. 5B illustrates a process of encrypting an electronic envelope in accordance with the preferred embodiment of the present invention.

FIG. 5B illustrates the process of encrypting an electronic envelope in accordance with the preferred embodiment of the present invention. First, a password/PIN specified by the customer is used for encrypting the envelope so that the electronic envelope can be decrypted using the same password/PIN. It is important to note that the encryption is unique to the customer and the envelope. Once the customer at step 400 specifies the password/PIN, an MD5 Random algorithm step 402 and an Algorithm object step 404 is performed, respectively in this order. Next, at step 406 and step 408, a unique envelope ID data and an electronic envelope data is used in the RC4 encryption process step 410. Preferably, the RSA RC4 40-bit key is used to encrypt the electronic envelope. The customer may download the signed plug-in before opening the envelope, or the customer may have already downloaded the plug-in at the time of signing on with the OTC. The electronic envelope is then opened using the signed plug-in. The customer is then requested to enter the password/PIN to decrypt the envelope. Although the envelope can be encrypted with the method described above, a digital encryption method using digital certificates may be used as an alternative preferred method for encrypting. After the customer enters the correct password in the password box 100, the front of the electronic envelope 40 is displayed to the customer as illustrated in FIG. 6. The customer is now able to view and open the electronic envelope 40 in step 66. The front of the electronic envelope 40 preferably includes an OTC address/link 102, a customer e-mail address 104, a time/date postmark 106, a security label 108, and an open envelope icon 112 for opening and viewing the document(s) contained inside the electronic envelope 40.

The front of the electronic envelope 40 can also be used as an interactive tool. For instance, the customer can click on the OTC address/link 102 to link to the OTC home web page, and other graphics and web links (not shown) may be displayed on the front of the electronic envelope 40 in accordance with the present invention. The postmark 106 is used to assure that the electronic envelope 40 was sent in a timely fashion, and the security label 108 gives the customer further assurance that the electronic envelope 40 and the documents contained therein were transmitted with the strictest security and confidentiality.

The customer can next click on the open envelope icon 112 displayed on the front of the electronic envelope 40 in order to view the documents inside in step 68. Preferably, an electronic trade confirmation document 120 is displayed on the customer's station 22 as illustrated in FIG. 7. The trade confirmation document 120 preferably includes detailed information about each trade made by the customer on a particular day, where each document 120 corresponds to each trade transaction. The trade details that are stored in the OTC database 28 are exported to the envelope server 38 so that the trade confirmation document 120 can be prepared. The electronic envelope 40 can contain multiple documents 120 for multiple trade transactions. The customer can save the document 120 in its decrypt form for later review, and/or print out the document 120 for the customer's file. After reviewing, printing, and/or saving the document 120, the customer can then close the electronic envelope 40.

At step 70, after the customer closes the electronic envelope 40, a return receipt is transmitted to the OTC via the Internet or private network. FIG. 8 illustrates a receipt envelope window 124 displayed on the station 22, at which time the receipt envelope window 124 informs the customer that a return receipt message has been transmitted to the OTC. Thus, the OTC receives immediate notification that the electronic envelope 40 and the document 120 contained therein were opened and viewed by the customer. FIG. 2 further illustrates the transmission path of the return receipt from the station 22 to the envelope server 38. If for some reason, the return receipt is not received by the OTC within a predetermined period of time from the time of transmitting the trade confirmation document, a reminder email can be transmitted to the customer's station or the trade confirmation document can be faxed or physically mailed to the subscriber. The predetermined period of time may be 4 hours, 48 hours, etc., but preferably, the predetermined period of time in accordance with the present invention is 24 hours.

As can be appreciated, the method described above is cost effective for the OTC as the costs for postage, printing or the like are reduced or eliminated. This method also provides the customer with a secure and interactive manner to get financial documents online using the Internet and a standard e-mail address.

Figure 9A:
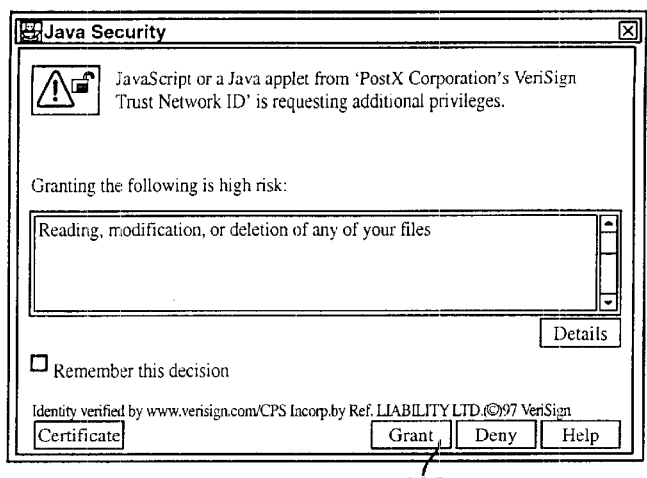
FIGS. 9A–9C illustrate security windows presented to the customer requesting security privileges for Netscape browser in accordance with the preferred embodiment of the present invention.
Figure 9B:
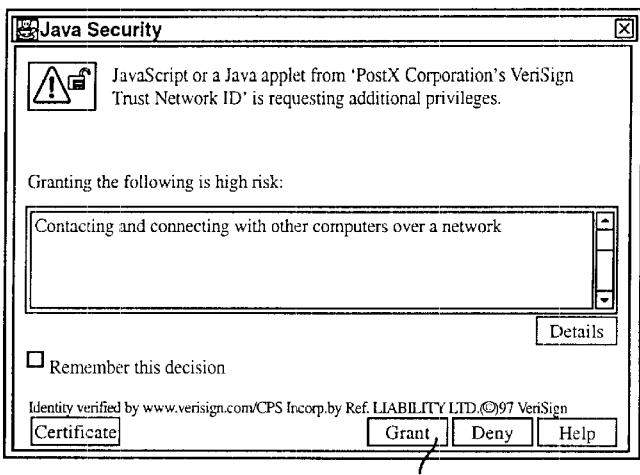
Figure 9C:
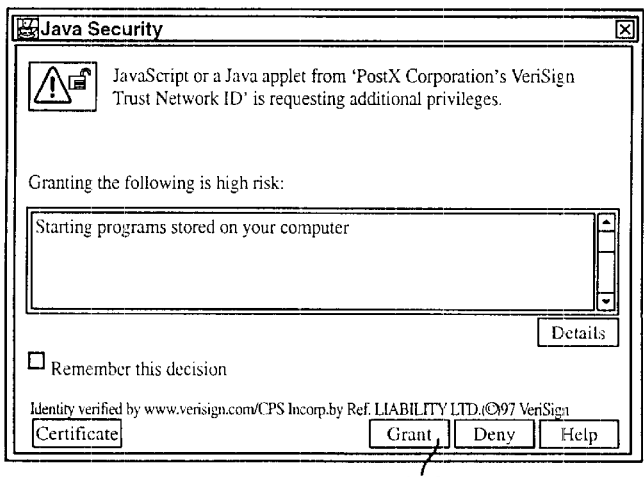
Figure 10:
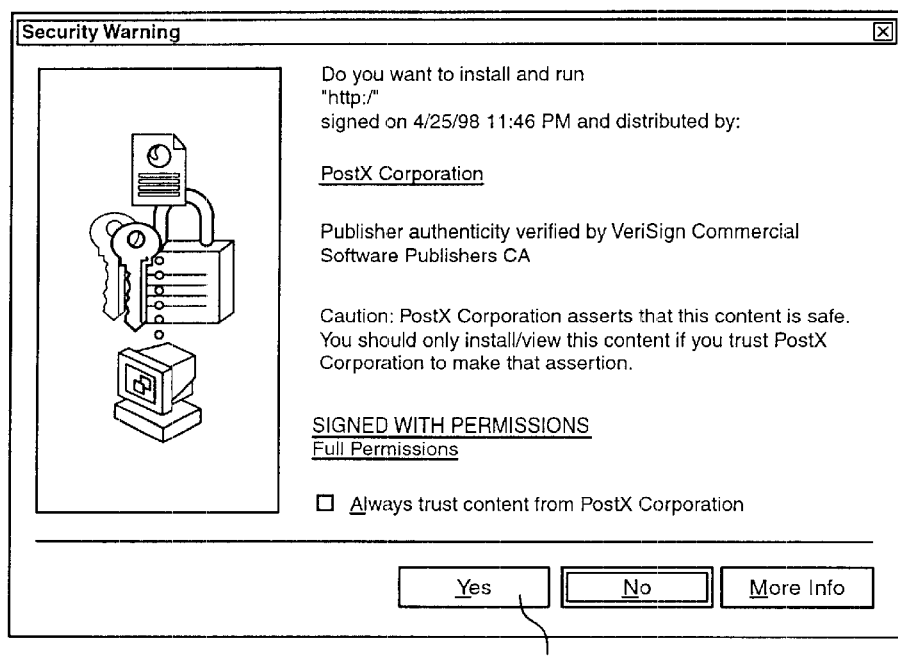
FIG. 10 illustrates a security window presented to the customer requesting security privileges for Internet Explorer browser in accordance with the preferred embodiment of the present invention.

In addition to the security measures described above, other security windows may be displayed when the customer receives the electronic envelope 40 for the first time. For example, FIGS. 9A–9C illustrate additional security windows associated with the Netscape Communicator/Navigator browser, while FIG. 10 illustrates a security measure associated with the Microsoft Internet Explorer browser. The electronic envelope 40 is generally opened by a Java applet that is signed by the OTC using object-signing certificates obtained from a Certificate Authority.

The envelope opener plug-in is signed to provide sender authentication to the customers. Different procedures exist for signing the plug-in for Microsoft Internet Explorer and Netscape Communicator browsers. For example, for the Internet Explore browser, an X.509 certificate is obtained from the certificate authority (i.e. Verisign) for code signing cab files. This certificate is obtained using the Internet Explorer browser. The envelope opener plug-in is then packaged in a cab file, which is signed using the certificate. The cab file is then time-stamped using Verisign time-stamping service for Microsoft Authenticode.

Next, the step needed to sign a Netscape plug-in includes obtaining an X.509 certificate from the certificate authority (i.e. Verisign) for object signing. This certificate can be obtained using the Netscape Communicator browser. A Netscape object signing tool "zigbert" is used for signing the envelope opener code. The tool uses the certificate name and location as its parameters, and the files are then compressed into a JAR file.

FIGS. 9A–9C illustrate windows displayed to the customer when the customer is using the Netscape Communicator/Navigator browser to receive the electronic envelope 40 for the first time. Although three security windows are shown for the current implementation of the Netscape browser, more or less security windows may be used with later versions of the browser. Preferably, in the current implementation of the Netscape browser, three security windows will be presented to the customer, and the customer will need to grant all three privileges before the electronic envelope 40 can be displayed. FIG. 9A illustrates a window 130 requesting a File IO privilege that is required because the envelope opener software needs to create a working directory to store the temporary files. The customer can grant the File IO privilege by clicking on a grant button 132. Next, FIG. 9B illustrates a network privilege window 134 requesting a network privilege so that the envelope opener software can send responses back to the envelope server 38. Again, the customer can grant the network privilege by clicking on a grant button 136. Finally, with reference to FIG. 9C, a process privilege window 138 is displayed requesting a process privilege. By clicking on a grant button 140 once again, the browser can be launched to go to an URL.

When the Microsoft Internet Explorer is being used as the customer's web browser, preferably, only one security window is needed. FIG. 10 illustrates a window 150 requesting the customer to grant full privileges (File IO, Network, and Process privileges) so that the electronic envelope 40 can be displayed. The customer can grant the full privileges by clicking on a yes button 152.

Figure 11:
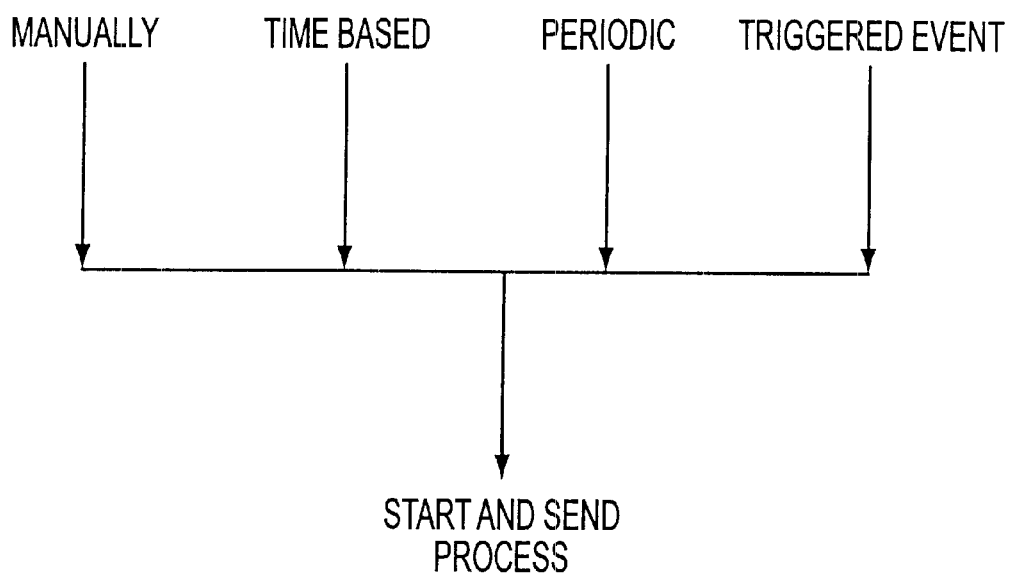
FIG. 11 illustrates a chart showing various methods for beginning the transmission of the electronic envelope to the customer in accordance with the preferred embodiment of the present invention.
Figure 14:
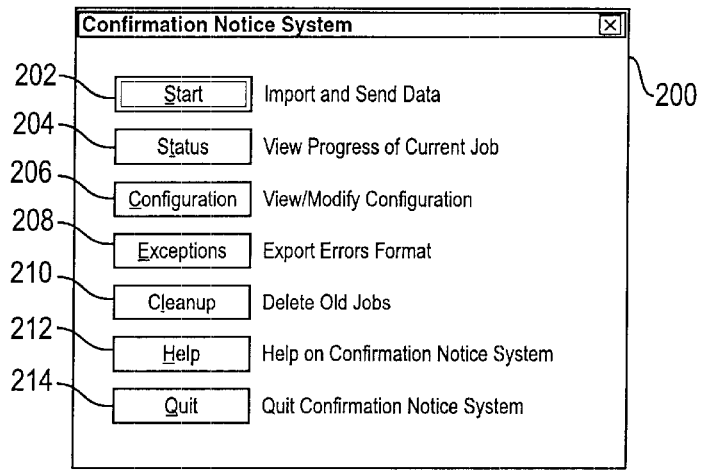
FIG. 14 illustrates a confirmation mailer subsystem user interface window in accordance with the preferred embodiment of the present invention.

FIG. 11 illustrates a chart showing various methods that can trigger the beginning of the transmission of the electronic envelope 40 to the customer in accordance with the preferred embodiment of the present invention. The methods described herein with reference to FIG. 11 are closely related to step 62 of FIG. 3. The OTC system 26 in accordance with the present invention preferably uses SMTP/POP3 mail server to transmit e-mail messages to the customer. The electronic envelope 40 can be transmitted to the customer when a certain event occurs. For example, an OTC operator can manually start the electronic envelope 40 transmission process by pressing a "Start" button 202 in the confirmation mailer subsystem user interface as illustrated in FIG. 14. Alternatively, the electronic envelope 40 can be transmitted on a timely basis at a predetermined time of each day, or the electronic envelope 40 can be transmitted periodically, i.e. weekly, monthly, daily, etc. Further, the electronic envelope 40 can be transmitted as soon as the data is parsed and imported into the envelope server database 36. For example, as soon as the customer completes a trade at the OTC web site, this event triggers the transmitting of the electronic envelope 40. The customer can further request the OTC to transmit the electronic envelope 40 by requesting so at any time.

Figure 12:
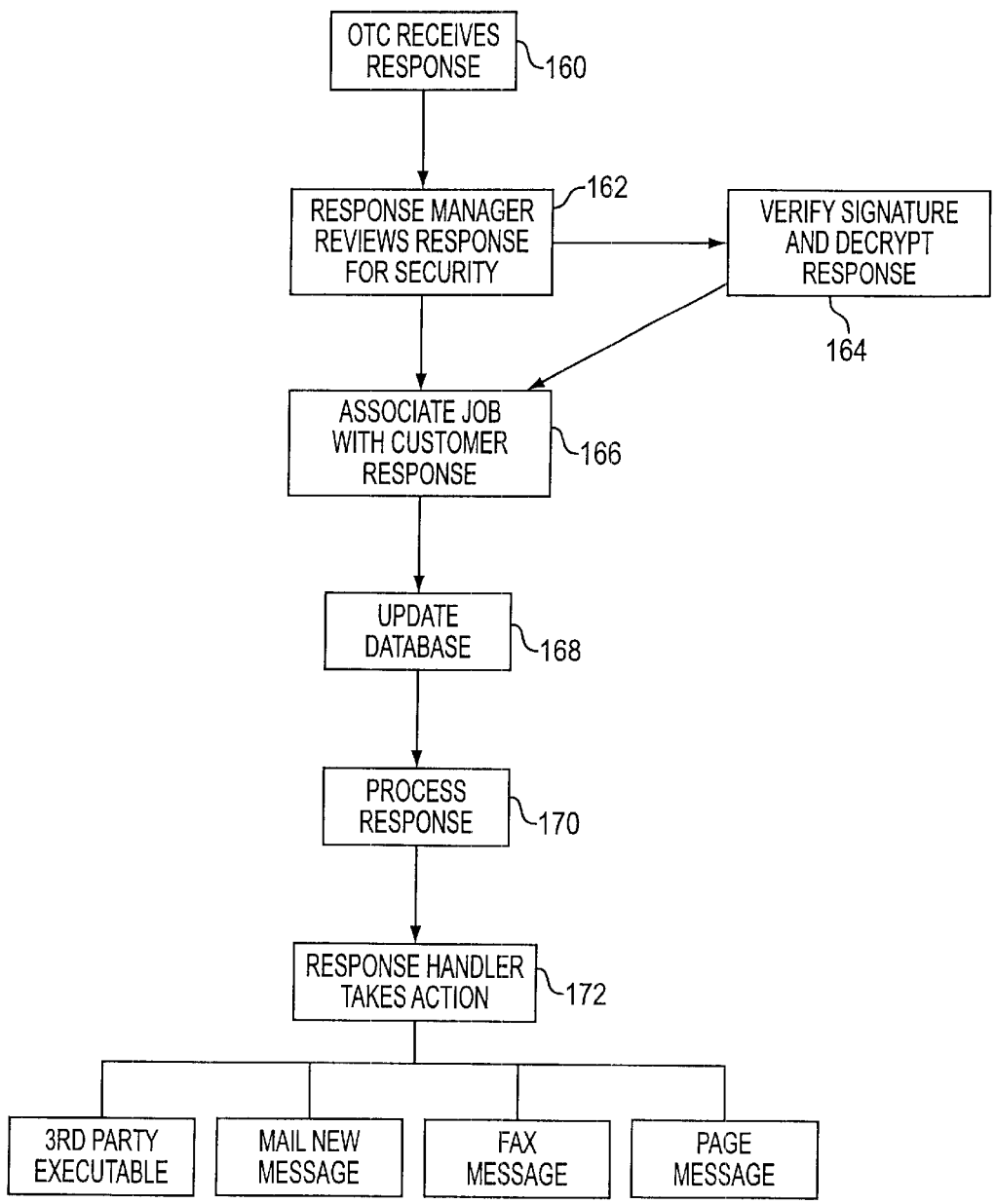
FIG. 12 illustrates a flow chart showing a method for integrated handling of responses in accordance with the preferred embodiment of the present invention.

FIG. 12 illustrates a flow chart of a method for integrated handling of responses in accordance with the preferred embodiment of the present invention. The present invention has the ability to confirm whether the electronic envelope 40 has been opened and viewed by the customer by transmitting a response to the OTC when the customer closes the electronic envelope 40. By this method, the OTC can track how many customers have opened and closed electronic envelopes 40 at any given time. The customer can further transmit additional information such as specific requests, surveys, etc., back to the OTC through this method.

At step 160, the OTC receives a response from the customer after the electronic envelope 40 has been opened and closed. Similar to the method used for transmitting the electronic envelope 40 to the customer, the response can also be transmitted encrypted, particularly when the response contains confidential information. Preferably, a response manager at the OTC will review the response at step 162 to determine whether the response is encrypted. Preferably, the response manager is a service. If the response was sent encrypted, the response manager will verify the signature and decrypt the response at step 164. At step 166, the response manager will associate a job with the customer response. The response manager will then update the envelope server database 36 at step 168 and process the customer response at step 170. The response manager will then request a response handler to further process the response. The response handler is a module, which can be used to perform a variety of jobs such as invoking software applications, sending a new e-mail, faxing documents, performing additional services, etc. at step 172, based on the customer response. The response handler can also track responses that are not received and can take appropriate action, like using alternative ways of transmitting the trade confirmations. The response handler may also be used to send a reminder e-mail or fax the trade confirmation document.

Figure 13:
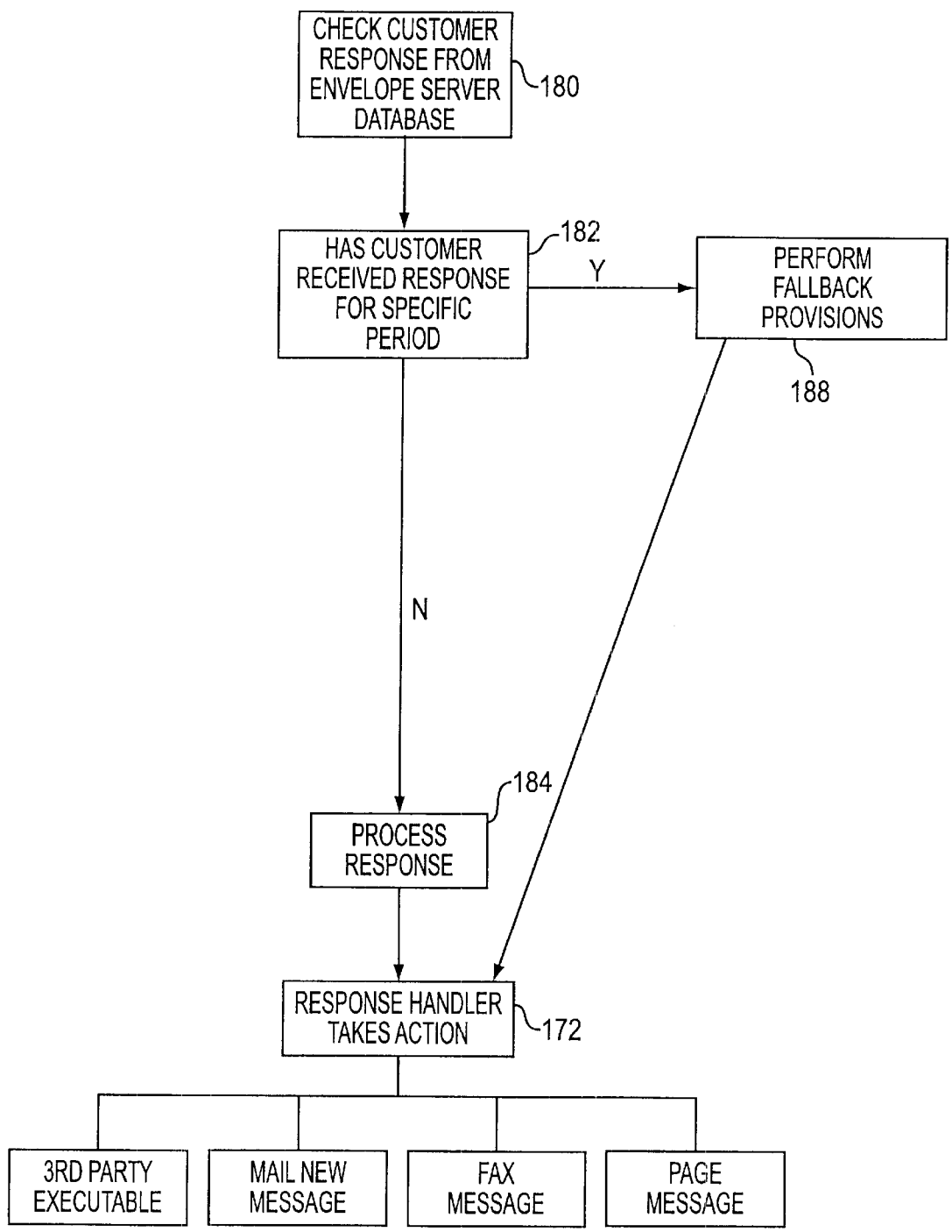
FIG. 13 illustrates a flow chart showing a method for independent handling of responses in accordance with the preferred embodiment of the present invention.

FIG. 13 illustrates a flow chart of a method for independent handling of responses in accordance with the preferred embodiment of the present invention. At step 180, the response manager receives and reviews the response from the envelope server 38 for each customer. At step 182, the response manager can further determine whether a response was in fact received from the customer during a specified period of time. If the response manager did receive the response, the response manager then analyzes the response and processes the response as requested by the customer in step 184. The response handler then receives the response from the response manager and executes it according to the choices outlined above at step 172 of FIG. 12. If, however, the response manager has not yet received the response, then the response manager performs fallback mechanisms in step 188. The fallback mechanisms are the choices similar to the ones outlined in step 172.

The method for independent handling of responses is similar to the method for integrated handling of responses, except that the method of integrated handling of response uses the response handler module that is integrated with the response manager. Using the method for integrated handling of responses, responses are retrieved and parsed from the POP server, and the OTC database is updated accordingly. The response is then immediately forwarded to the response handler for further processing. In the method for independent handling of responses, on the other hand, the response manager is an independent entity. Thus, the independent response handler module does not receive responses from the POP server, and instead reads the updated responses from the envelope server database 36 and processes them accordingly. Thus, the activity of the response handling is independent of the response retrieval and management.

The confirmation mailer subsystem 34 in accordance with the preferred embodiment of the present invention will now be described in detail with reference to FIGS. 14–20. The confirmation mailer subsystem 34, or confirmation notice system, will preferably be a Windows NT or UNIX based application, with a beginning user interface window 200 as illustrated in FIG. 14. The confirmation notice system window 200 allows an OTC operator to execute the following functions: start a new configuration mailing process (import and send data); view status of current mailing or job; view and modify configuration information; get exception reports; clean up old data; get help regarding the confirmation notice system; and quit the confirmation notice system.

Figure 15:
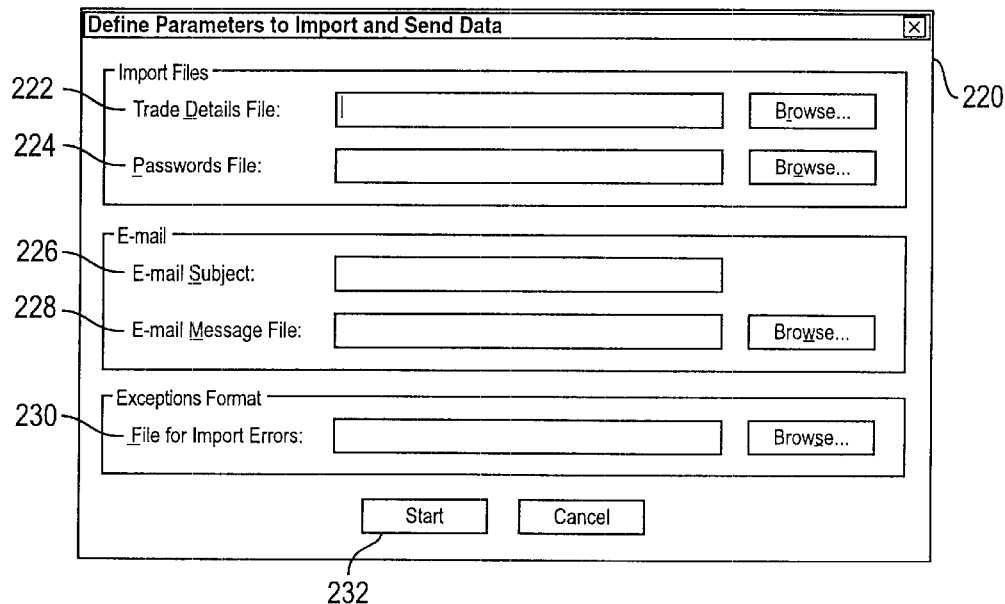
FIG. 15 illustrates an import and send data window in accordance with the preferred embodiment of the present invention.

When the operator selects a start button 202 as shown in FIG. 14, the operator is prompted to an import and send data window 220 as illustrated in FIG. 15. The import and send data window 220 allows the operator to import and send files, and allows the operator to define the parameters for importing and sending data. First, a trade details box 222 contains trade details data, and a password file box 224 contains account numbers, passwords, and e-mail addresses of those customers who have elected to receive confirmation notices at their e-mail addresses. In an e-mail subject box 226, the electronic envelope 40 can display up to preferably 31 characters. Next, an e-mail message file box 228 contains the name and location of the file containing the e-mail messages. Finally, a file for import errors box 230 contains errors encountered while parsing the input files. This exception file contains trade detail information for accounts with failed transmissions due to either parsing or other errors while importing the data to the envelope server database 36. The exception file can be used as an input to the fallback mechanism that will send the conventional paper trade confirmation.

After selecting the start button 232 from the import and send data window 220, data from the OTC database 28 will be parsed and imported into the envelope database 36. Transmitting of the electronic envelopes 40 will begin immediately after importing such data.

Figure 16:
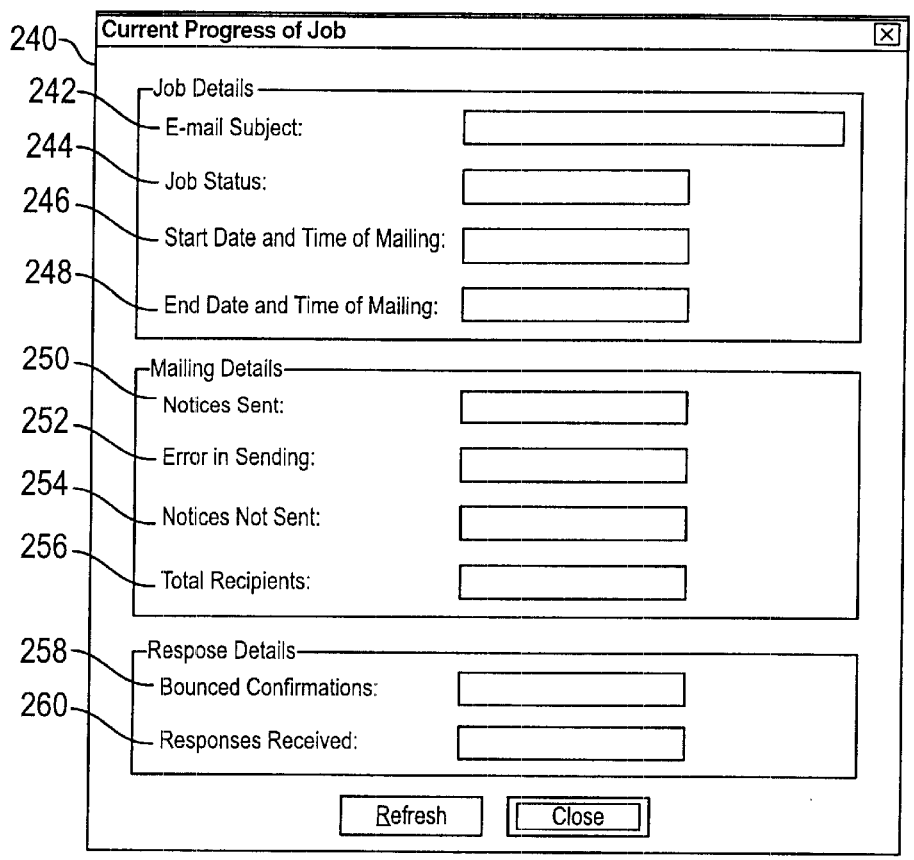
FIG. 16 illustrates a current progress of job window in accordance with the preferred embodiment of the present invention.

The operator can next select a status button 204 to view status information for a job currently in progress and/or the last job that was scheduled. When the operator selects the status button 204, a current progress of job window 240 as illustrated in FIG. 16 is displayed. An e-mail subject box 242 shows the subject of the confirmation notice transmitted to the customer. Next, a job status box 244 indicates the progress of the job, i.e. sending, completed, error, aborted, or incomplete. A start date and time of mailing box 246 shows the date and time when the mailing of the electronic envelope 40 began or will begin. Likewise, an end date and time of mailing box 248 shows the estimated end date and time of the job in progress, or the end date and time if the job has been completed. A notice sent box 250 indicates the total number of confirmation notices that were transmitted for a specified period of time. An error in sending box 252 shows the number of confirmation notices that could not be transmitted due to error, and a notice not sent box 254 shows the number of confirmation notices that would not be sent if jobs were aborted before complete transmission. Further, a total recipients box 256 shows the total number of customers that were imported into the envelope server database 36. This number indicates the number of people who will get the confirmation notices electronically for the current mail transmission. Next, a bounced confirmations box 258 indicates the number of confirmation notices that were bounced back, and the response received box 260 indicates the number of return receipts received by the envelope server 38.

Figure 17:
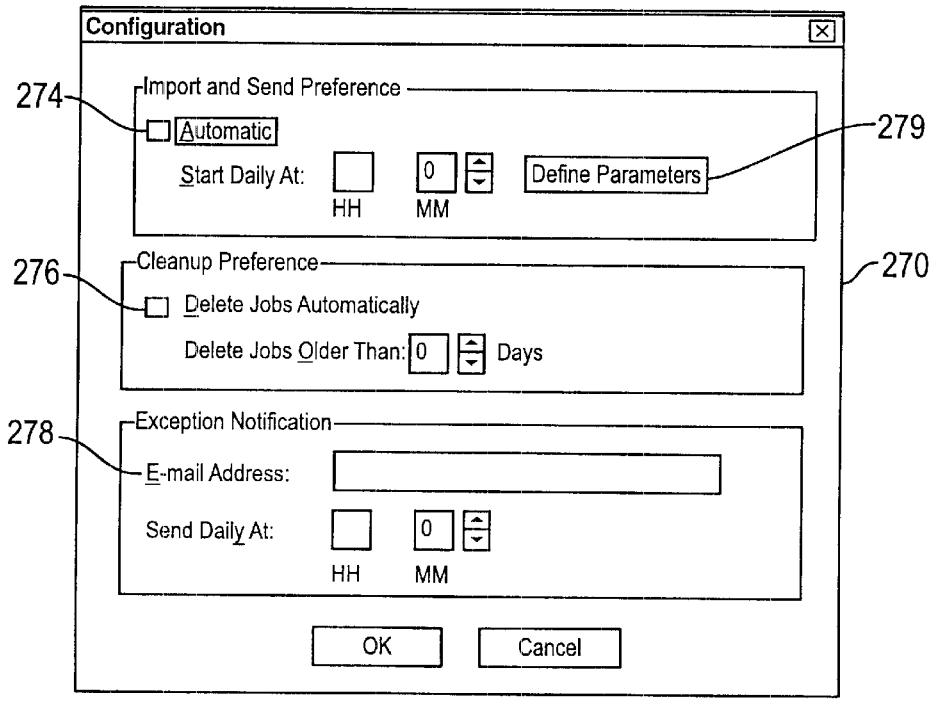
FIG. 17 illustrates a configuration window in accordance with the preferred embodiment of the present invention.

The operator can next select a configuration button 206 to view and edit the configuration data. When the operator selects the configuration button 206, a configuration window 270 as illustrated in FIG. 17 is displayed.

In the configuration window 270, the operator can check an automatic box 274 so that the OTC will be able to specify the time when the import and send process would automatically run on a daily basis. The confirmation mailer subsystem 34 will look for the input file names at the specified time and begin the process of importing data. If the required data files are not available at the specified starting time, an e-mail message will be sent to a specified OTC e-mail address indicating that the importing and/or transmission process did not begin because there were no data. The OTC operator can then start the process manually. The inputted files will not be processed if the trade details files contain a previously processed date and time stamp in the header record. This mechanism prevents the same confirmation to be sent for the second time. The input to the confirmation mailer subsystem 34, for example, are the trade details file and the password file. These two files bear timestamps and the subsystem 34 will not process files with the same time stamp.

Next, if the operator checks the delete jobs automatically box 276, the application will automatically clean up data which is older than a specified number of days. An e-mail address box 278 is used to send error notifications to system or system operator.

If the operator selects the mode of operation to be automatic, then the operator should select the define parameters button 279 in order to specify parameters necessary to start the transmitting process.

Figure 18:
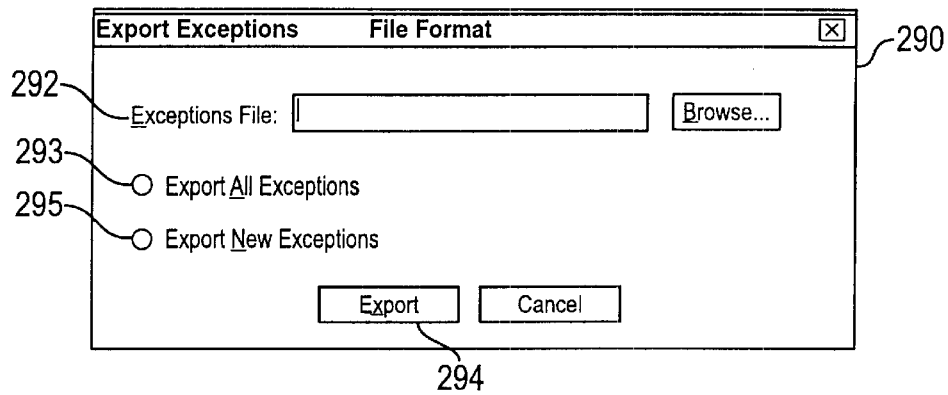
FIG. 18 illustrates an export exceptions window in accordance with the preferred embodiment of the present invention.

Referring back to FIG. 14, the operator can select an exceptions button 208 to get details of exceptions that have occurred. Exceptions may be generated for "bounce back" mail, or for errors that occur while transmitting the electronic envelope 40. When the operator selects the exceptions button 208, the export exceptions window 290 as illustrated in FIG. 18 will be displayed. An exceptions file box 292 is used to input a file name and location into which the exception data should be logged. If the operator clicks an export all exceptions box 293, then all exceptions that have occurred thus far will be reported. An export new exceptions box 295 allows all exceptions that have not been reported earlier to be reported at the time the operator clicks the box 295.

When the operator selects an export button 294 in the window 290, confirmation notices that were unable to be transmitted earlier will be exported to the specified exceptions file. This exception file will be the same format as the company trade details file. The exception file can be used as an input to the fallback mechanism that will send the conventional paper trade confirmation.

Figure 19:
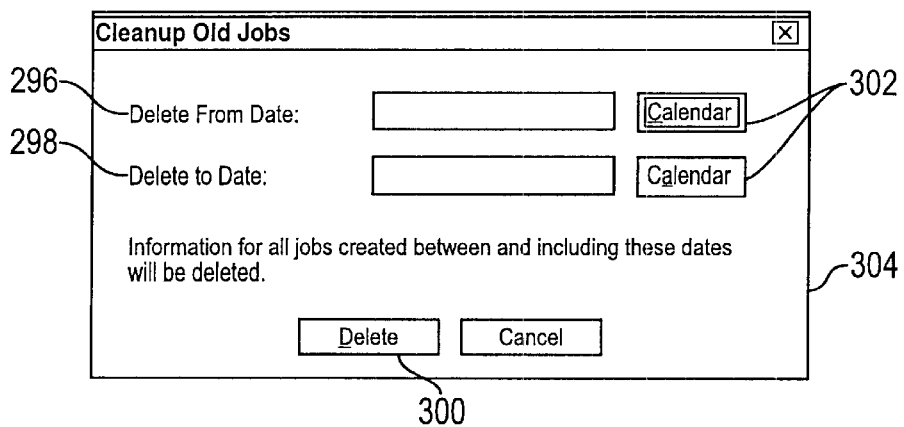
FIG. 19 illustrates a cleanup window in accordance with the preferred embodiment of the present invention.

The operator can select a cleanup button 210 from the window 200 to cleanup old data from the system. FIG. 19 illustrates a cleanup window 304 in accordance with the present invention. A delete from date box 296 allows the operator to input the start date from which data is to be deleted and a delete to date box 298 allows the operator to input the end date to which data is to be deleted. The result of deleting data is that all subsequent responses for the job are forwarded to the forwarding e-mail address specified in the envelope server 38. Also, status information on subsequent bounced mail for the deleted jobs will not be processed nor captured by the envelope server 38. Thus, all bounced mails for the deleted job will also be forwarded to the forwarding e-mail address specified in the envelope server configuration.

Figure 20:
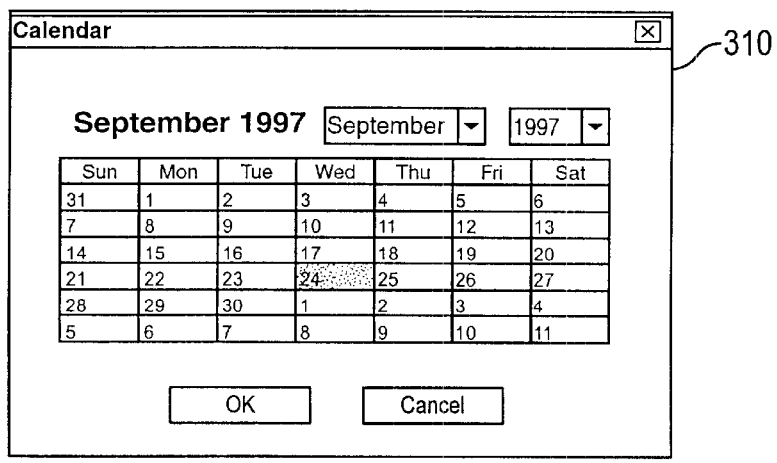
FIG. 20 illustrates a calendar window in accordance with the preferred embodiment of the present invention.

When the operator selects a delete button 300, all jobs including send status and responses created from the delete from date through the delete to date will be deleted. The calendar buttons 302 are used to enter the date for each field. FIG. 20 illustrates a calendar window 310 in accordance with the present invention.

Once the jobs are scheduled for action, the envelope server 38 will dispatch the electronic envelopes 40 to the customers. A job status report will be transmitted to the operator after the job is completed. This report will contain a summary of errors, if any, or will indicate that the job was successful. Any errors encountered here will also be sent to the exception handler subsystem 42.

The exception handler subsystem 42 will now be described in further detail. Preferably, all errors encountered in the OTC 26, confirmation mailer subsystem 34 and/or the envelope server 38, will be handled by the exception handler subsystem 42. The exception handler subsystem 42 processes and consolidates all errors, and creates reports for (1) errors encountered while parsing and importing data into the envelope server database 36, (2) errors encountered while transmitting electronic envelopes 40 to the customers, (3) status of jobs immediately after its completion, (4) bounced response messages, (5) errors associated with the failure of the trade confirmation system.

If an error occurs while importing data, an e-mail with error details will be transmitted to the address specified in the configuration window 270 in the e-mail address box 278. The trade details information in OTC input file for this customer will be copied into the import exceptions file. The import exception file can then be used as the input to the fallback mechanism that will send the conventional paper trade confirmation.

If an error is encountered while transmitting electronic envelopes 40 to the customers, the status report will indicate the error. The status report is sent as an attachment in the e-mail notification, and is sent as soon as the job is completed/aborted. The e-mail notification is sent to the notification address specified in the confirmation mailer subsystem. If the envelope server 38 detects bounced back messages, an e-mail will be transmitted daily at a specified time to the address specified in the configuration window 270. This e-mail message will also contain a summary of the errors, if any, and a list of account numbers and the e-mail addresses for those electronic trade confirmations that were bounced back. The operator can export these exceptions using the export exceptions option. The trade details information for all customers whose confirmation notices could not be sent or were bounced back will be copied into the specified exceptions file. The exceptions file can be used as an input to the fallback mechanism that will send the conventional paper trade confirmation.

Whenever the OTC system of the present invention is shut down for any reason, the exception handler subsystem provides alternative methods of transmitting the trade confirmation documents to the customers. For instance, the trade confirmation documents can be printed out in hardcopy form and faxed and/or physically mailed to the customers.

Although various preferred embodiments of the present invention have been disclosed for illustrative purposes, those skilled in the art will appreciate that various modifications, additions and/or substitutions are possible without departing from the scope and spirit of the present invention as disclosed in the claims.

What is claimed is:

1. A method for transmitting an encrypted electronic envelope having one or more trade confirmation documents to a subscriber station, the method comprising the steps of:
   storing password data and trade details data in a database;
   generating the encrypted electronic envelope and the one or more trade confirmation documents based on the password data and the trade details data; and
   transmitting the encrypted electronic envelope having the one or more trade confirmation documents to the subscriber station.

2. A method according to claim 1, wherein the transmitting step further comprises the step of transmitting the encrypted electronic envelope to the subscriber station over one of a public internet and a private network.

3. A method according to claim 1, wherein the password data is supplied to the database from a subscriber.

4. A method according to claim 1, wherein the trade details data is based on information of each trade performed by a subscriber.

5. A method according to claim 1, wherein the electronic envelope comprises an electronic mail.

6. A method according to claim 5, wherein when an error is encountered while transmitting the electronic mail to the subscriber station, an alternative transmitting step is performed to transmit the one or more trade confirmation documents.

7. A method according to claim 6, wherein the error comprises of a failure of a host system.

8. A method according to claim 7, wherein the host system comprises of a failure of a trade confirmation system.

9. A method according to claim 8, wherein the alternative transmitting step comprises the step of faxing the one or more trade confirmation documents to the subscriber station.

10. A method according to claim 8, wherein the alternative transmitting step comprises the step of physically mailing the one or more trade confirmation documents.

11. A method according to claim 6, wherein the error comprises of a transmission failure of the electronic mail over one of a public internet and a private network.

12. A method according to claim 11, wherein the alternative transmitting step comprises the step of re-transmitting the electronic envelope having the one or more trade confirmation documents to the subscriber station.

13. A method according to claim 12, wherein the alternative transmitting step further includes the step of faxing the one or more trade confirmation documents to the subscriber station.

14. A method according to claim 11, wherein the alternative transmitting step comprises the step of printing and physically mailing hardcopies of the one or more trade confirmation documents.

15. A method according to claim 5, wherein the electronic envelope includes a front side having a subscriber e-mail address, a time and date stamp, a security label, and an open envelope icon.

16. A method according to claim 1, wherein each of the one or more trade confirmation documents includes detailed information of each trade performed by the subscriber.

17. A method according to claim 1, wherein the subscriber station comprises a computer.

18. A method for electronically confirming an online trade, the method comprising the steps of:
   performing the online trade by a subscriber via a trading company;
   storing trade details data associated with the online trade and password data associated with the subscriber in a database;
   encrypting an electronic envelope and a trade confirmation document based on the trade details data and the password data;
   transmitting the encrypted electronic envelope and the trade confirmation document to a subscriber station, wherein the trade confirmation document is enclosed in the electronic envelope; and
   decrypting the encrypted electronic envelope at the subscriber station, thereby allowing the subscriber to view the trade confirmation document.

19. A method according to claim 18, wherein the decrypting step further comprises the step of providing a subscriber password to the trading company.

20. A method according to claim 19, wherein after the decrypting step, the electronic envelope is opened and the trade confirmation document enclosed therein is viewed by the subscriber.

21. A method according to claim 18, wherein the electronic envelope comprises an electronic mail.

22. A method according to claim 21, wherein when an error is encountered while transmitting the electronic mail to the subscriber station, an alternative transmitting step is performed to transmit the trade confirmation document.

23. A method according to claim 22, wherein the error comprises of a failure of a host system.

24. A method according to claim 23, wherein the host system comprises a failure of a trade confirmation system.

25. A method according to claim 23, wherein the alternative transmitting step comprises the step of faxing the trade confirmation document to the subscriber station.

26. A method according to claim 23, wherein the alternative transmitting step comprises the step of physically mailing the trade confirmation document.

27. A method according to claim 22, wherein the error comprises of a transmission failure of the electronic mail over one of a public internet and a private network.

28. A method according to claim 27, wherein the alternative transmitting step comprises the step of re-transmitting the electronic envelope having the trade confirmation document to the subscriber station.

29. A method according to claim 28, wherein the alternative transmitting step further includes the step of faxing the trade confirmation document to the subscriber station.

30. A method according to claim 27, wherein the alternative transmitting step comprises the step of printing and physically mailing a hardcopy of the trade confirmation document.

31. A method according to claim 21, wherein the electronic envelope includes a front side having a subscriber e-mail address, a time and date stamp, a security label, and an open envelope icon.

32. A method according to claim 18, wherein after viewing the trade confirmation document, the electronic envelope is closed and a return receipt is automatically transmitted to the trading company.

33. A method according to claim 32, wherein when the return receipt is not received by the trading company within a predetermined time period from the time of transmitting the trade confirmation document, a reminder email is transmitted to the subscriber station.

34. A method according to claim 33, wherein the predetermined time period is twenty four hours.

35. A method according to claim 32, wherein when the return receipt is not received by the trading company within a predetermined time period from the time of transmitting the trade confirmation document, the trade confirmation document is faxed to the subscriber station.

36. A method according to claim 35, wherein the predetermined time period is twenty four hours.

37. A method according to claim 32, wherein when the return receipt is not received by the trading company within a predetermined time period from the time of transmitting the trade confirmation document, the trade confirmation document is physically mailed.

38. A method according to claim 37, wherein the predetermined time period is twenty four hours.

39. A method according to claim 18, wherein after viewing the trade confirmation document, the electronic envelope is closed and a response is transmitted to the trading company.

40. A method according to claim 39, wherein the response is sent encrypted.

41. A method according to claim 39, wherein the response comprises one of a survey, a request for invoking a software application, and a request for additional services.

42. A method according to claim 18, wherein the trade confirmation document includes detailed information of each trade performed by the subscriber.

43. An electronic trade confirmation system comprising:
    a database adapted to store password data and trade details data; and
    an envelope server adapted to generate an encrypted electronic envelope and a trade confirmation document based on the password data and trade details data for electronically transmitting the encrypted electronic envelope having the trade confirmation document to a subscriber station.

44. An electronic trade confirmation system according to claim 43, wherein the envelope server is adapted to transmit the electronic envelope and the trade confirmation document to the subscriber station over one of a public Internet and a private network.

45. An electronic trade confirmation system according to claim 43, wherein the envelope server is adapted to receive a response from the subscriber station over one of a public internet and a private network.

46. An electronic trade confirmation system according to claim 45, wherein the response includes a return receipt that is generated when the electronic envelope has been opened and closed from the subscriber station.

47. An electronic trade confirmation system according to claim 46, wherein the return receipt is automatically transmitted to the system.

48. An electronic trade confirmation system according to claim 47, wherein when the return receipt is not received by the system within a predetermined time period from the time of transmitting the trade confirmation document, a reminder email is transmitted to the subscriber station.

49. An electronic trade confirmation system according to claim 48, wherein the predetermined time period is twenty four hours.

50. An electronic trade confirmation system according to claim 47, wherein when the return receipt is not received by the system within a predetermined time period from the time of transmitting the trade confirmation document, the trade confirmation document is faxed to the subscriber station.

51. An electronic trade confirmation system according to claim 50, wherein the predetermined time period is twenty four hours.

52. An electronic trade confirmation system according to claim 47, wherein when the return receipt is not received by the system within a predetermined time period from the time of transmitting the. trade confirmation document, the trade confirmation document is physically mailed.

53. An electronic trade confirmation system according to claim 52, wherein the predetermined time period is twenty four hours.

54. An electronic trade confirmation system according to claim 43, wherein the subscriber station comprises a computer.

55. An electronic trade confirmation system according to claim 43, wherein the encrypted electronic envelope is decrypted at the subscriber station by providing a subscriber password.

56. An electronic trade confirmation system according to claim 55, wherein the electronic envelope can be opened after providing the subscriber password.

57. An electronic trade confirmation system according to claim 43, wherein the password data is provided by a subscriber.

58. An electronic trade confirmation system according to claim 43, wherein the electronic envelope comprises an electronic mail.

59. An electronic trade confirmation system according to claim 43, wherein the envelope server further includes an exception handler subsystem for processing errors associated with the system.

60. An electronic trade confirmation system according to claim 59, wherein the exception handler subsystem processes errors encountered while storing password data and trade details data into the database.

61. An electronic trade confirmation system according to claim 59, wherein the exception handler subsystem processes errors encountered while transmitting the electronic envelope to the subscriber station.

* * * * *